United States Patent [19]
Khoylian et al.

[11] 3,993,189
[45] Nov. 23, 1976

[54] PROCESSING CONVEYOR

[75] Inventors: Rouzas R. Khoylian, Belmont; Hans G. Haimberger, Pinehurst; James R. Cowdery, Andover, all of Mass.

[73] Assignee: Design & Process Engineering, Inc., Burlington, Mass.

[22] Filed: May 8, 1975

[21] Appl. No.: 576,013

[52] U.S. Cl. ............................. 198/465; 198/469; 198/472; 198/604; 198/626
[51] Int. Cl.² ....................................... B65G 37/00
[58] Field of Search .................. 198/85, 82, 102; 214/16.4 C; 62/63, 382, 378

[56] References Cited
UNITED STATES PATENTS

| | | | |
|---|---|---|---|
| 1,123,934 | 1/1915 | Schrafft et al. | 198/102 X |
| 1,635,406 | 7/1927 | Greer | 198/82 X |

Primary Examiner—John J. Love
Assistant Examiner—Douglas D. Watts
Attorney, Agent, or Firm—John W. Ericson

[57] ABSTRACT

A product conveyor for use in processing machinery such as freezers and the like, in which a series of product conveying mats is continuously moved in a closed path from a rising section in which the mats are raised gradually upwardly during the process, a transfer section in which the mats are transferred from the top of the rising section to a falling section where they are conveyed downwardly through the processing environment, and to an unloading station and a return section where the product is unloaded and the mats are returned to the input side of the rising section. Apparatus is provided for synchronizing the transitional movement of the mats from the different sections with their arrival so that the operations required to transfer the mats in turn through the different stages of the apparatus are accomplished smoothly and automatically.

8 Claims, 15 Drawing Figures

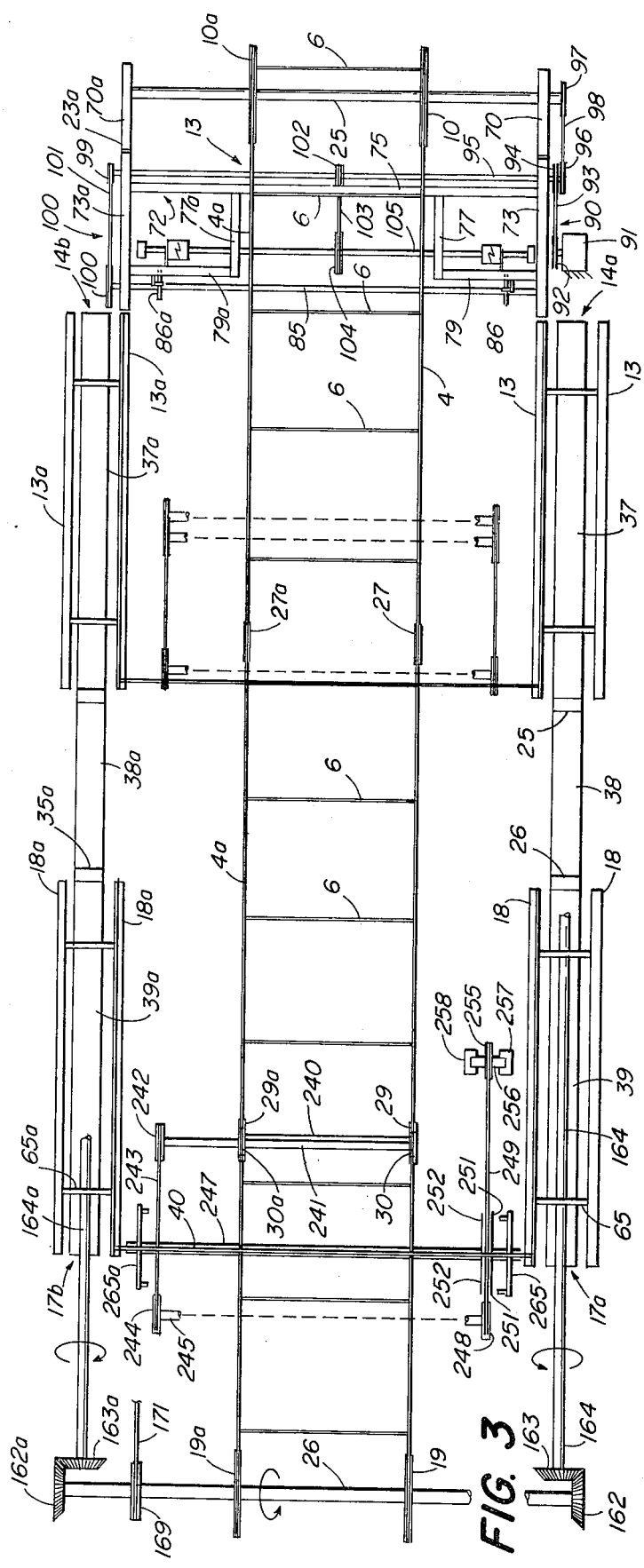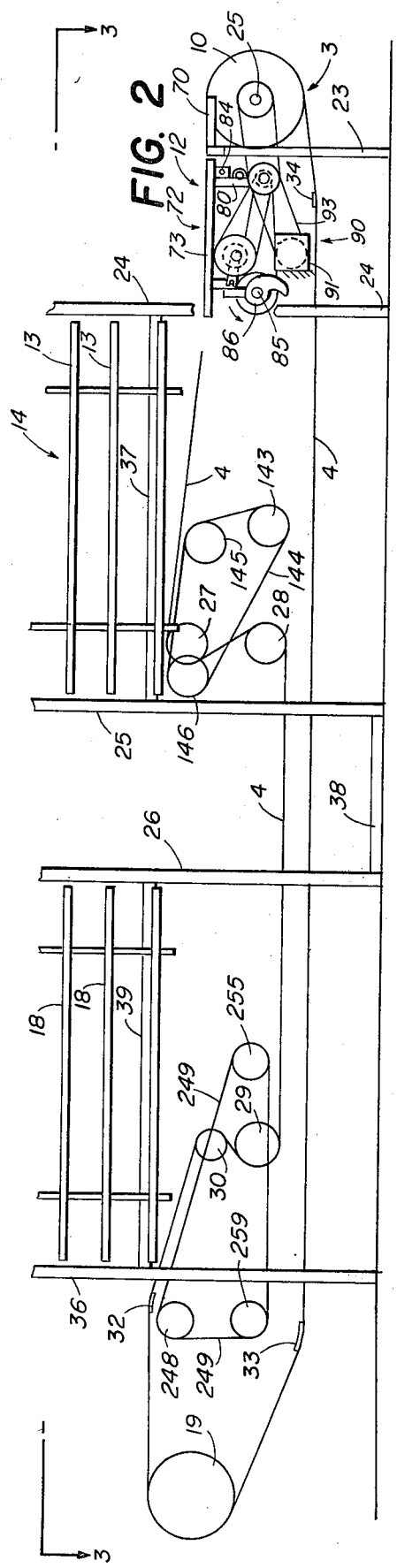

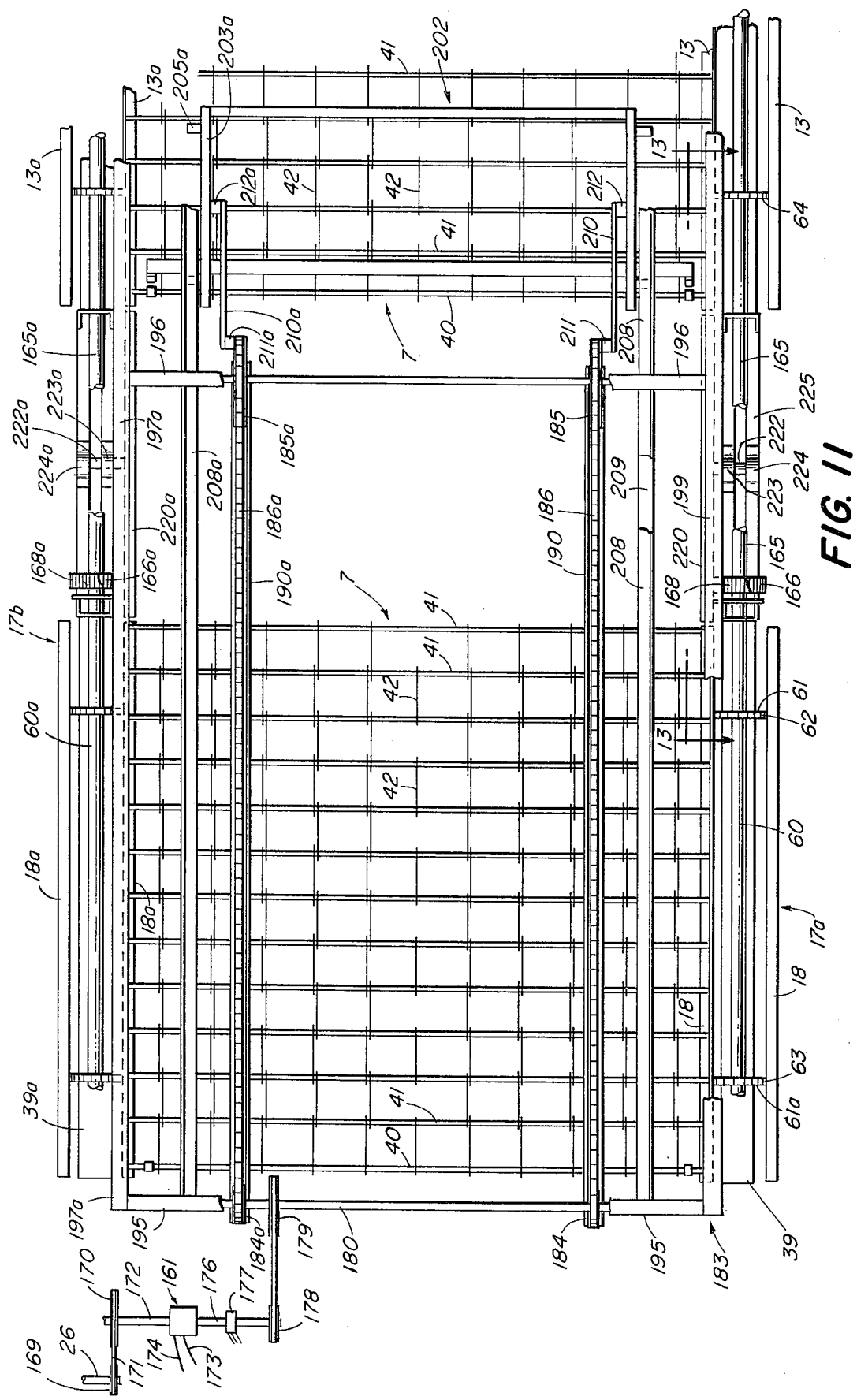

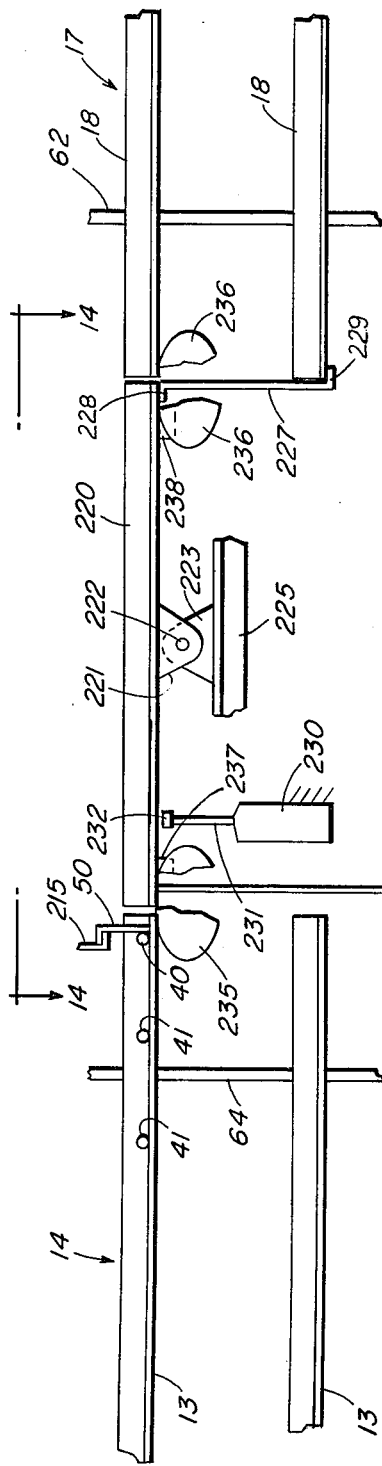
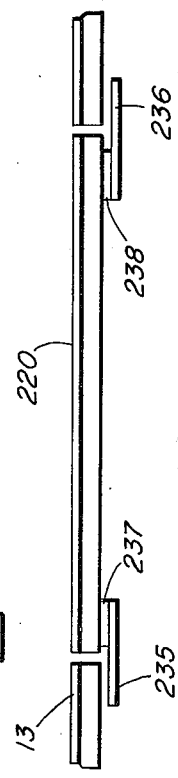
FIG. 13
FIG. 14

PROCESSING CONVEYOR

This invention relates to automatic processing, such as food processing, and particularly to a novel conveying system for moving food products or other articles through a processing cycle.

Various processing operations, such as heating, cooling, drying, freezing and the like, require the exposure of a product to a controlled processing environment for a predetermined length of time. For most large volume applications, it is highly desirable to carry a stream of product continuously through the processing environment, so that energy costs for start up and shut down are minimized, and the amount of handling required is reduced.

A straightforward approach to continuous processing is to place the product on an endless conveyor belt that moves the product through the processing zone and out to an unloading station in a direct path at a relatively slow speed. Obviously, such an arrangement requires considerable floor space per unit of product processed per hour. One proposal that has been made for increasing efficiency in this regard is to arrange a number of conveyor belts moving in opposite directions, one over the other, and to dump the product at the end of one belt down on to the other belt going in the opposite direction. Apparatus for this purpose is illustrated, for example, in U.S. Pat. No. 3,708,995, issued on Jan. 9. 1973 to Dennis R. Berg for Carbon Dioxide Food Freezing Method and Apparatus.

One problem with a stacked conveyor system of the kind described in the above cited patent is that the dumping of the product from one conveyor to the next at the end of each pass may damage the product. An there is inherently a tendency to turn the product units upside down, which is unacceptable in the case, for example, of open packages of fish sticks, fried potatoes, or the like. Moreover, product handled in this way is inherently loaded at one level and unloaded at another.

Another approach to the conveyor problem has been to feed the product in on trays into an elevator tower, where the trays are carried up in a stacked array to a delivery station. Such an arrangement is shown in U.S. Pat. No. 2,527,542, issued on Oct. 31, 1950 to Gilson for Method and Apparatus For Freezing Materials. An elevator tower greatly reduces required floor space, but again requires loading and unloading on different levels, and considerable handling of trays.

The primary object of this invention is to facilitate the continuous movement of products such as fish sticks, vegetables, fried potatoes, pies or the like, in unpackaged form or in pans, packages, or the like continuously through a processing environment of relatively small volume relative to the throughput rate and residence time, without damage to the product. A particular object of the invention is to enable the product to be conveyed from one type of conveyor to another with minimum product damage, while reducing the need for the manual loading and unloading of trays incident to the process itself.

Briefly, the above and other objects of the invention are attained by a novel conveyor system essentially comprising a main conveyor that continuously receives product carrying mats at a pickup station, transfers them to a delivery station where product is automatically unloaded from the mats, and then moves the mats back through a return section to a loading station, where they are loaded with new product. Mats newly loaded with input product are carried through an infeed section to an unlatch station, where the loaded mats are taken from the main conveyor and transferred to a first elevator, by means of which they are carried in a spaced vertical array through a processing zone to a transfer section. In the transfer section, each arriving mat loaded with product that has been partially processed is transferred to a second elevator. Mats transferred to the second elevator are moved downwardly, in fixed spaced relationship, to a pickup station adjacent the main conveyor. There they are transferred from the second elevator to the main conveyor, and procede to the delivery station. By this arrangement, the mats are recycled and the product is continually unloaded at the delivery station. Particular features of the invention are novel arrangements for transferring the product from the main conveyor to the first elevator, from the first elevator to the second elevator, and then back to the main conveyor, synchronously and continuously, without damage to the product.

The manner in which the apparatus of the invention is constructed, and its mode of operation, will best be understood in the light of the following detailed description, together with the accompanying drawings, of an illustrative embodiment thereof.

In the drawings,

FIG. 2 is a fragmentary elevational schematic sketch of a portion of the apparatus of FIG. 1, with parts omitted, illustrating the functional relationship of some of the basic parts without obscuring detail;

FIG. 3 is a schematic plan view of the apparatus of FIG. 2, taken substantially along the lines 3—3 in FIG. 2;

FIG. 4 is a fragmentary schematic perspective sketch of a product carrying mat, two of which are shown schematically in FIG. 2, that is adapted to carry packaged food products such as fish sticks, fried potatoes, or the like;

FIG. 11 is a schematic fragmentary plan view of the transfer section of FIG. 1, taken substantially along the lines 11—11 in FIG. 1;

FIG. 13 is a fragmentary schematic elevational view, with parts omitted and parts broken away, of a mat support mechanism forming a part of the transfer section shown in plan in FIG. 11, taken substantially along the lines 13—13 in FIG. 11;

FIG. 14 is a fragmentary schematic plan view, with parts omitted and parts broken away, of the apparatus of FIG. 13, taken substantially along the lines 14—14 in FIG. 13.

Figure 1:
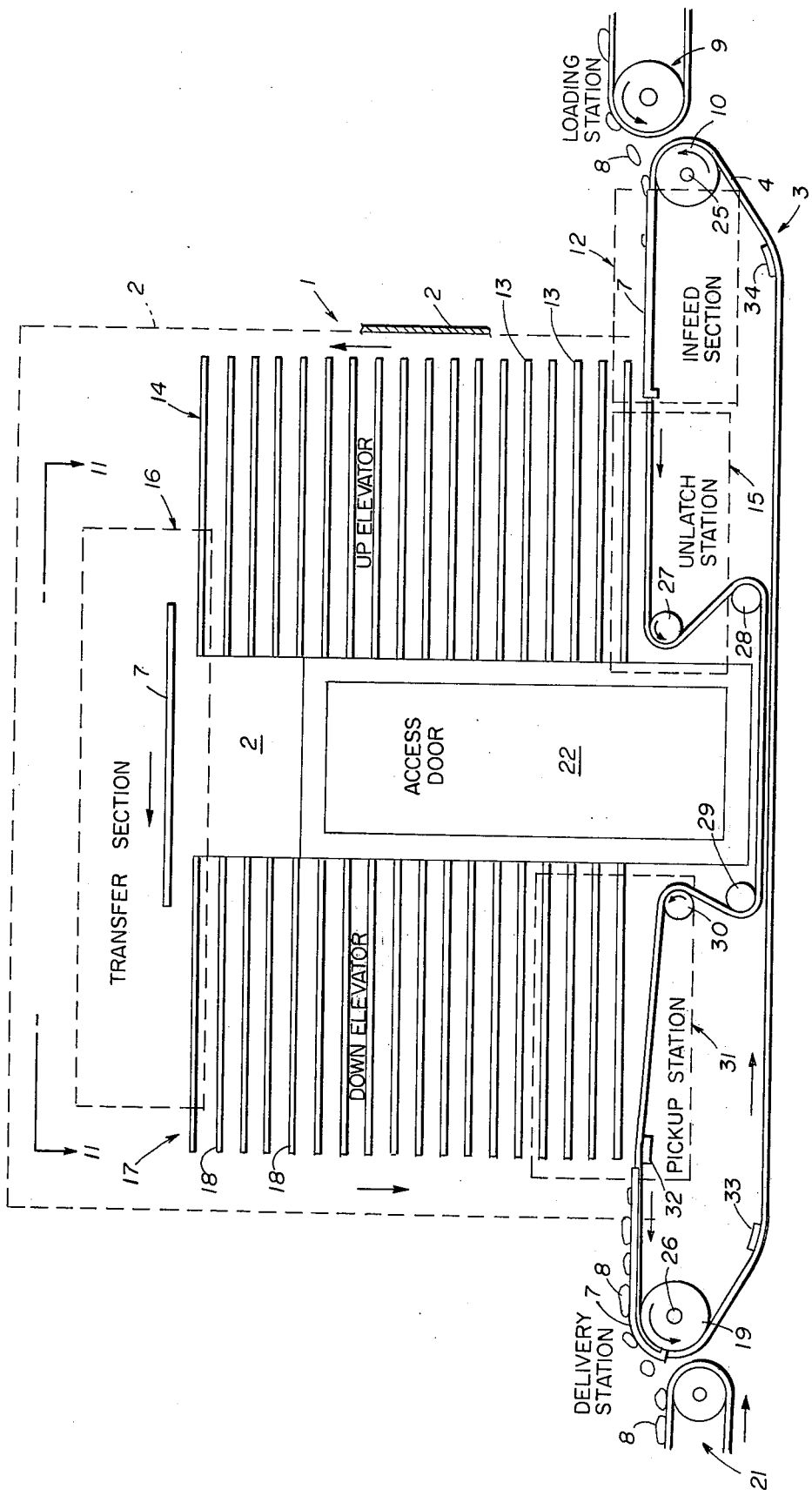
FIG. 1 is a schematic elevational view of a food processing conveyor in accordance with the invention, shown in relation to a loading station and a delivery station.

Referring first to FIG. 1, there is shown a processing unit generally designated 1 that may be generally enclosed in any conventional housing suggested at 2. A processing environment, for example, a cooling or freezing environment, can be maintained in the housing 2 in any conventional fashion, as by blowing cold air through the housing 2.

The product conveying apparatus of the invention comprises a main conveyor generally designated 3. The main conveyor 3 comprises, in a particular preferred embodiment of the invention, a pair of main endless flexible carrier elements 4 and 4a, shown schematically in FIGS. 1 and 3. In practice, the flexible carrier elements 4 and 4a, and other flexible carrier elements to be described, may be made in the form of flexible timing belts of fiber reinforced synthetic resin, such as polyurethane rubber or the like, but in a presently preferred embodiment of the invention, they are made in the form of chains of the nature of bicycle chains. Such chains comprise sections each consisting of a pair of plates joined by pivot pins at the ends to form a continuous belt. To simplify the description of the invention, these flexible carrier elements will simply be referred to hereinafter as chains, to avoid the repetitious reference to obvious alternatives.

As shown in FIGS. 1 and 3, the chains 4 and 4a are arranged to move in parallel paths. They are interconnected at intervals by steel rods, some of which are shown at 6 in FIG. 3, at intervals selected to correspond to lengths of product carrying mats. Two such product carrying mats are shown schematically at 7 in FIG. 1, and suitable mats 7 will be described in more detail below.

As shown schematically in FIG. 1, the mats such as 7 are loaded with product units, indicated schematically at 8 in FIG. 1, which are transferred at a loading station from an input conveyor, generally designated 9, onto the successive mats 7 as they pass around a pair of sprockets 10 and 10a, shown in FIGS. 1 and 3, past the loading station into an infeed section generally designates 12.

In the infeed section, mats such as 7 carrying product units such as 8 are gradually raised as they are loaded onto carriers generally designated 13. The carriers 13 are rising at spaced intervals under the influence of an up elevator generally designated 14. The chains 4 and 4a are sufficiently slack to allow them to be raised with the mats such as 7 during this process.

When each mat 7 reaches an appropriate position in its passage toward an unlatch station, generally designated 15, in which it has been fully advanced onto the corresponding carrier 13 in the up elevator 14, a first carrier exchange means comprising an unlatching mechanism, to be described, removes it from the main chains 4 and 4a so that it is then free to move up on the up elevator 14 until it reaches a transfer section designated 16. In the transfer section 16, each mat such as 7 is removed from the carrier 13 of the up elevator on which it has been loaded by a second carrier exchange means, to be described.

Each mat 7 that is so removed from the up elevator 14 is moved in the direction of the arrow through the transfer section 16 over to a down elevator generally designated 17. There, the mat 7 is deposited into a corresponding carrier 18 of the down elevator 17, and transferred gradually downwardly through the processing environment inside the housing 2. Each loaded mat 7 in the elevator 17 arrives at a pickup station generally designated 31, where it is transferred again to the main chains 4 and 4a by a third carrier exchange means, to be described.

The chains 4 and 4a of the main conveyor 3 carry the loaded mats 7 from the pickup station 31 around a pair of end sprockets 19 and 19a, where the product units 8 are deposited by gravity onto any suitable output conveyor, such as indicated schematically at 21. The input conveyor 9 and the output conveyor 21 can be substantially on the same level. This feature is a considerable advantage in most processing locations. It may be retained, while taking advantage of an opportunity to effect energy savings or other benefits to be gained by conducting the selected process in a pit or basement below the loading and unloading levels, by reversing the positions of the up and down elevators, so that the loaded mats 7 are successively lowered and then raised, if desired.

Comparing FIGS. 1, 2, and 3, the horizontal space between the up elevator 14 and the down elevator 17 comprises a passageway, to which service access may be provided by an access door suggested at 22. The walls of the outer housing 2, and bearings for the various shafts and cams to be described, are supported in a suitable frame, which may be made of steel angle irons or the like, and comprising typical members shown at 23, 24, 25, and 36–39 in FIG. 2. Because a complete showing of this necessary framework would complicate the drawings to the point where the description would become prolix and difficult to follow, and because those skilled in the art will well understand how to provide a frame to support the parts in the necessary working relationships shown, most of these support members have been omitted from the drawings, it being understood that they are placed where needed to support the parts shown.

Figure 5:
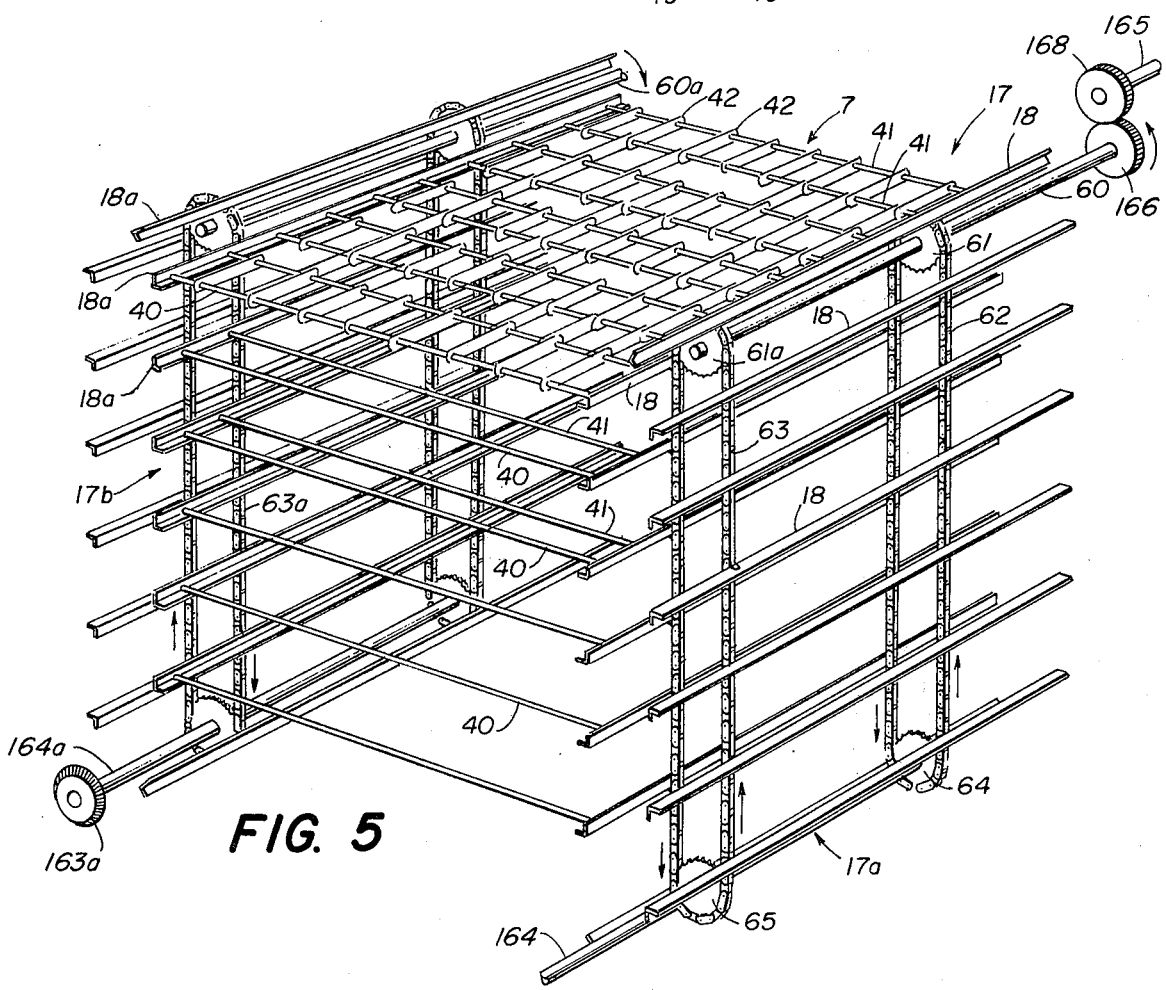
FIG. 5 is a fragmentary schematic perspective sketch of an elevator forming a part of the apparatus of FIGS. 1 through 3, shown in association with illustrative portions of typical product carrying mats of the kind shown in FIG. 4.
Figure 10:
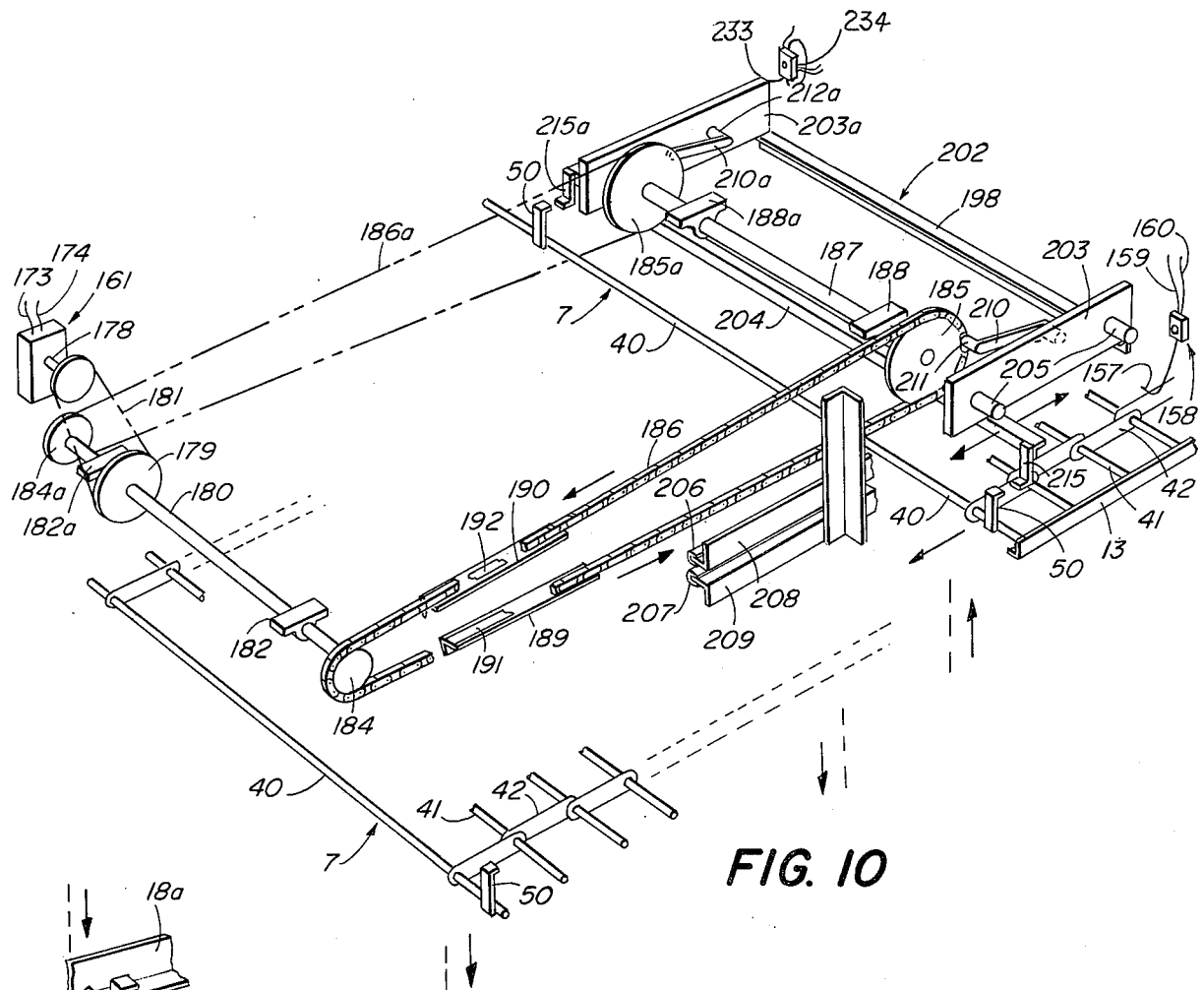
FIG. 10 is a fragmentary schematic perspective sketch, with parts omitted and parts broken away, showing the transfer section of the apparatus of FIG. 1 in more detail.

Similarly, as the chains, and the sprockets which drive the chains, are essentially conventional elements, they are shown throughout the drawings, except, for example, in a fragmentary way of FIGS. 5 and 10, as lines and circles, respectively. In addition, as the apparatus is essentially symmetrical about the central longitudinal axis in FIG. 3, such that each part on the lower side of that axis has a corresponding part on the upper side, the description of one side only will be given, for the most part, in being understood that the other side is just the same. To illustrate this point, typical elements such as 25 on one side are identified with the same reference character and a suffix a, as 25a, for example.

In particular, in the following description of the detailed path of the main chain 4, it will be understood that the corresponding chain 4a in FIG. 3 moves along a corresponding path. To demonstrate this point, the sprockets 10 and 10a are joined by a drive shaft 25

(FIG. 3), journalled in suitable supports as described above, so that the sprockets 10 and 10a move together. Similarly, the sprockets 19 and 19a are mounted on a common drive shaft 26, suitably journalled on conventional supports, so that those parts move together. Other sprockets described are correspondingly connected, and all driven by a common motor, as will appear.

Referring to FIG. 1, it will be seen that the main chain 4 moves over the sprocket 10, through the infeed section 12, thence to the unlatch station 15, and around a sprocket 27. The chain 4 passes around the sprocket 27, and thence around a lower sprocket 28. The chain 4 is then carried beneath the access door 22, and thence around a sprocket 29, then up over an upper sprocket 30 to the pickup station 31.

Where needed for support, there are provided chain supports, fixed to the frame members such as the members 36 and 37 in FIG. 2 in any conventional manner, to support the chain and the product carrying mats 7 thereon, and to guide the chain over desired paths. From one such chain guide support 32, the chain 4 passes over the sprocket 19, and then down around a chain guide 33 where it passes back through another chain guide 34 to the sprocket 10. FIG. 2 shows the parts somewhat more accurately in proportion than FIG. 1, though both are to be considered quite schematic. Supports for the mats 7, similar to the chain guides such as 32, are not shown but are preferably provided in the return section, below the chain 4 in FIG. 2 and between the guides 33 and 34, to keep the unloaded mats 7 from dragging on the floor through the return section.

Figure 4:
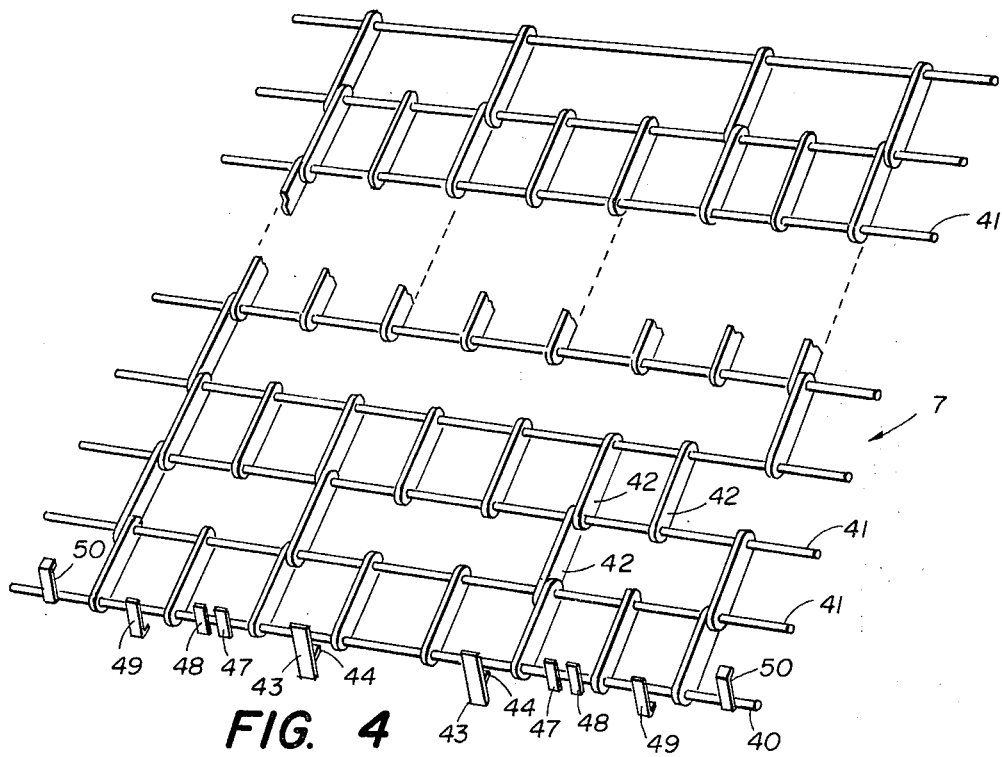

Referring next to FIG. 4, there is shown a typical product carrying mat 7 suitable for use in the apparatus of FIGS. 1 through 3 and particularly adapted for use in conveying packaged products such as boxes of fish sticks, fried potatoes, or the like. For the conveyance of unpackaged products, such as shrimp, fried potatoes, fish sticks, or other small articles, the mats such as 7 may be provided with a felt surface on which these products may be carried without dropping through. Since such matters of variation to accommodate particular articles will be apparent to the aritisan, the further description will be concerned with the particular example of the openwork mat such as 7 in FIG. 4, and the freezing of packaged fish sticks with cold air will be given as the illustrative example to avoid obfuscating the description with a redundant enumeration of obvious alternate purposes to which the apparatus of the invention can be put.

As shown in FIG. 4, each of the mats 7 comprises a series of parallel steel rods, comprising a leading rod 40, and any desired number of following rods 41 of equal length, although if desired the rods 41 may be of lighter gauge than the leading rod 40. The rods 40 and 41 are linked together to form a flexible mat by links 42, which are each freely pivoted at their ends to adjacent rods 41, or 40 and 41, and if desired spaced by collars or the like, in a manner which is sufficiently apparent without detailed description.

Figure 7:
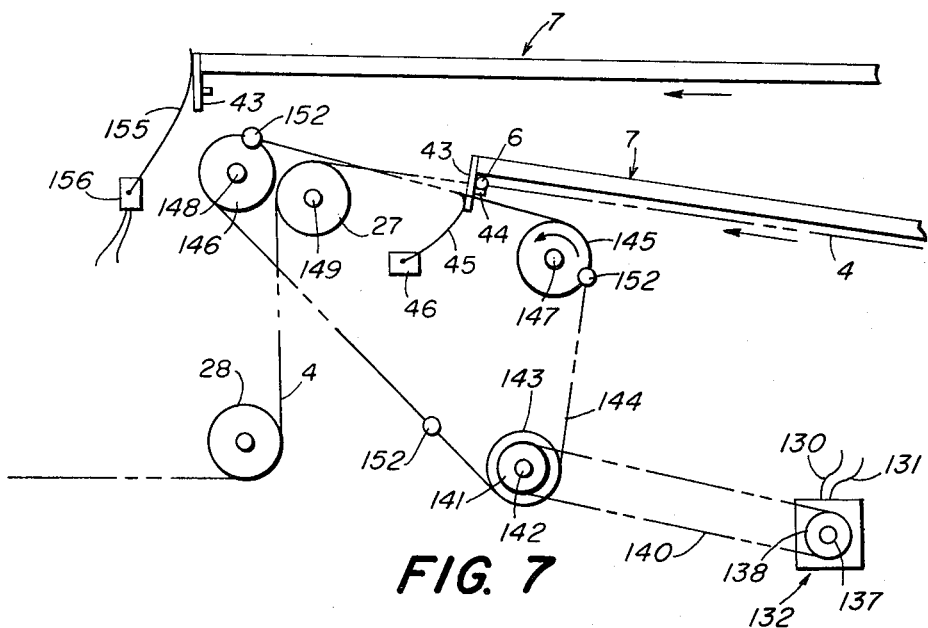
FIG. 7 is a fragmentary schematic elevational sketch, with parts omitted and parts broken away, of a portion of the unlatch section of the apparatus of FIG. 1.

On the leading rod 41 of each mat 7 there are formed a series of conveyor engaging members that perform various functions in the transfer of the mats 7 through the apparatus, in a manner that will appear. In particular, there are a first pair of generally T-shaped members 43 each welded to the lead rod 40. Comparing FIGS. 3, 4, and 7, a hook portion 44 formed at the rear of each of the hooks 43 is adapted to engage one of the cross rods 6 joining the chains 4 and 4a on the main conveyor 3. As schematically indicated in FIG. 7, one of the downwardly projecting portions of the members 43 is adapted to engage the actuating arm 45 of a microswitch 46, for purposes to be described.

On either side of the hooks 44 are disposed pairs of straight bars 47 and 48 that are adapted to engage the unlatch mechanism in a manner to be described. Outboard of the bars 47 and 48 are a pair of hooks 49 welded to the lead rod 40. The hooks 49 are adapted to engage the pickup mechanism, in a manner to be described. Outboard of the hooks 49 are a pair of upstanding hooks 50 adapted to engage the transfer mechanism, in a manner to be described.

FIG. 5 shows, in a somewhat fragmentary form, a typical carrier mat 7, and a few rods 40 and 41 of other mats 7, disposed on the down elevator 17, which may also be taken as an illustration of the up elevator 14 with the corresponding differences in the direction of the movement of the parts. Referring to FIG. 5, and comparing it with FIG. 3, the down elevator 17 comprises a right hand elevator portion 17a and a left hand portion 17b, seen in FIG. 5.

As best shown in FIG. 5, the elevator section 17a comprises a drive shaft 60 driven in the direction shown by the arrow in synchronism with the drive for the chains 4 and 4a of the main conveyor 3, and through conventional gearing, not shown, from the same drive motor, which may be any conventional electric motor or the like. As noted above, details of the bearings and supports for the shaft 60 are not shown, as their disposition and arrangement may be readily made by anyone skilled in the art, and because such detail would obscure the drawings.

The drive shaft 60 is fixed to a pair of spaced sprockets 61 and 61a, which drive a first endless chain 62 and a second endless chain 63, respectively. The lower end of the chain 62 meshes with and drives a sprocket 64, and the lower end of the chain 63 drives a sprocket 65, which is shown fragmentarily in somewhat more detail, as is the chain 63, to suggest the construction of the chains and sprockets otherwise shown more schematically elsewhere in the drawings.

The carriers 18 and 18a in the elevator sections 17a and 17b may comprise angle irons welded to selected portions of the chain, at spaced intervals which may in practice be, for example, 6 or 8 inches apart. When the shafts 60 and 60a are driven in the directions shown, the carriers 18 are moved downwardly on the inside of the elevator apparatus, and upwardly on the outside.

The ends of the rods 40 and 41 of the mats 7 are supported on the edges formed by the angle irons 18 and, on the left side, 18a, as shown in FIG. 5. The elevator section 17b is identical with the elevator section 17a, as sufficiently shown in FIG. 5, and comprises a main shaft 60a driven in synchronism with the shaft 60, but in the opposite direction as suggested by the arrow. The elevator construction is in itself conventional, and need not be further described.

Comparing FIGS. 1, 2, 3, 4, and 6, as each mat 7 passes around the sprockets 10 and 10a, its leading rod 40 and the following rods 41 are carried up onto a fixed entrance ramp, shown in FIGS. 2 and 3, which comprises a pair of horizontal rails 70 and 70a welded to the frame members 23 and 23a, respectively. This fixed level entrance way is followed by an elevator ramp designated 72, which comprises frame members 73 and 73a joined by a cross member 75, these pieces being made of angle iron welded together, for example, and reinforced by supporting panels comprising a pair of angle irons 77 and 77a welded to the cross piece 75. Additional members of this panel are formed by angle irons 79 and 79a welded between the pieces 77 and 73, and the pieces 77a and 73a, respectively.

Figure 6:
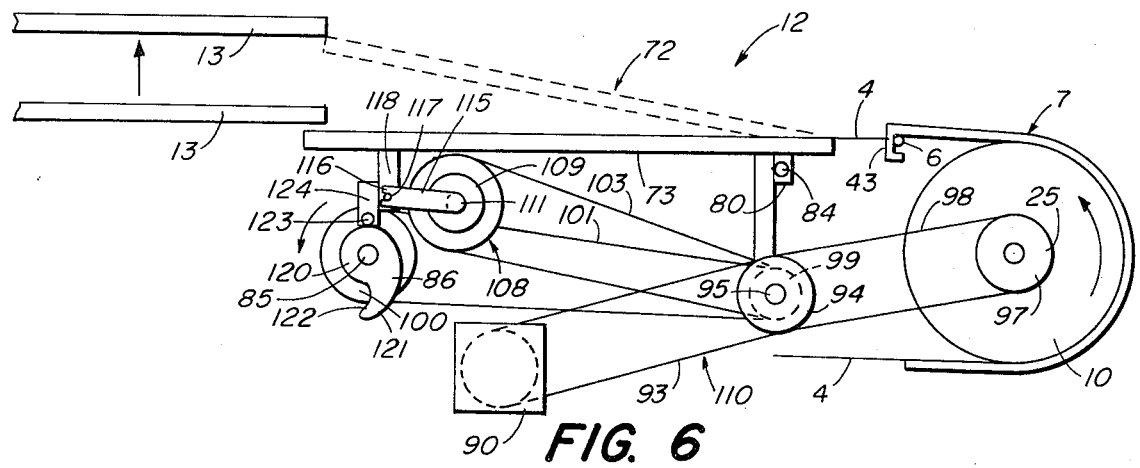
FIG. 6 is a fragmentary schematic elevational sketch with parts omitted and parts broken away, showing the infeed section of the apparatus of FIG. 1 in more detail.

As shown in FIGS. 2 and 6, a downwardly projecting post 80, welded to the ramp member 73, and a corresponding member, not shown, welded to the frame member 73a, are journalled in colinear stub shafts such as 84, shown in FIGS. 2 and 6, which in turn are fixed to suitable frame members in a manner not shown in detail.

By this arrangement, the frame 72 comprising the members such as 73 is adapted to swing about the axes of the shafts such as 84 between the solid line position shown in FIG. 6 and the dotted line position shown in FIG. 6. The ramp 72 is constrained from movement beyond these positions by a cam and overrunning clutch arrangement, next to be described.

Figure 12:
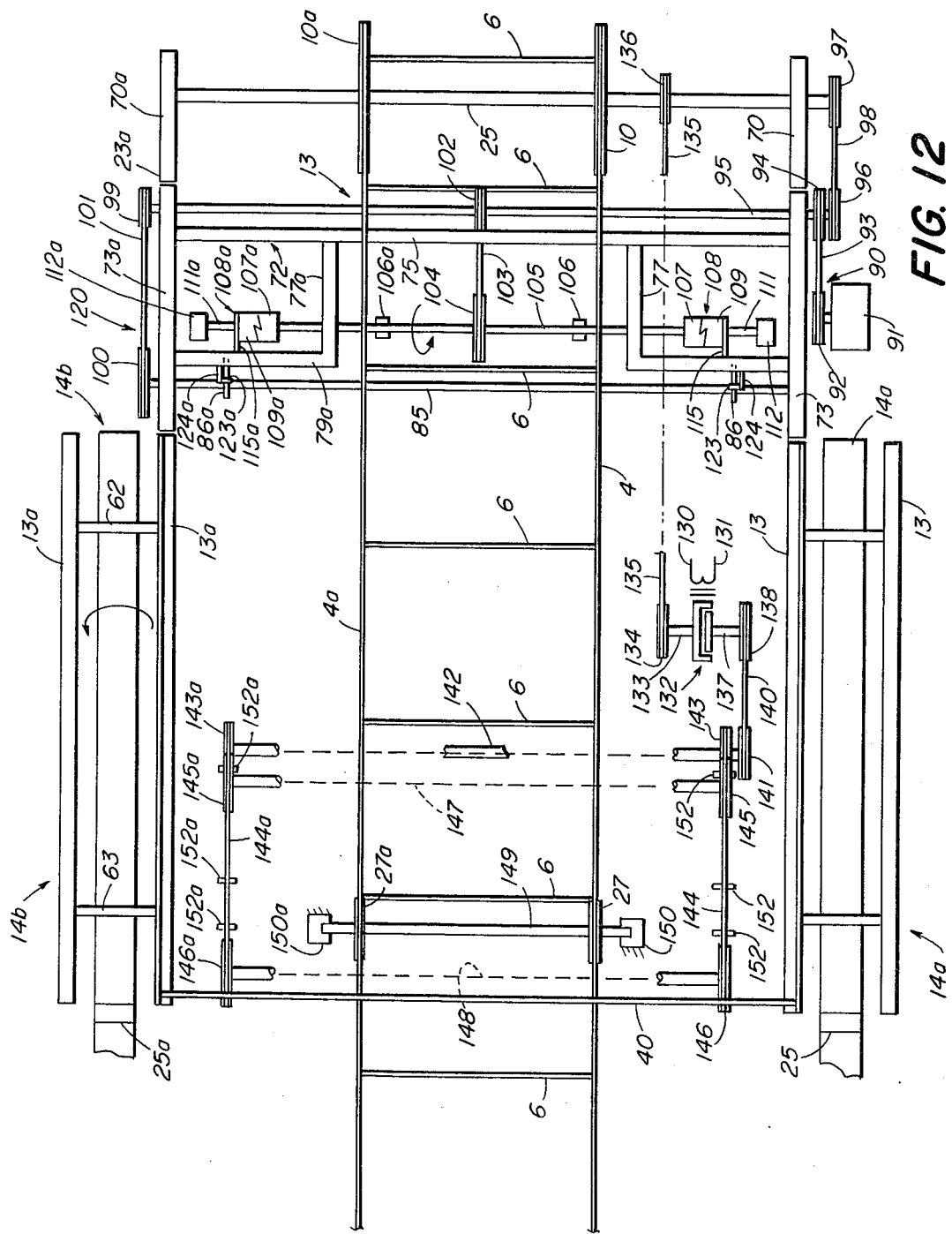
FIG. 12 is a schematic plan view, on an enlarged scale of the infeed secction of the apparatus of FIGS. 1 through 3.

Generally speaking, referring to FIG. 6, there is a cam shaft 85, shown more explicitly in FIGS. 3 and 12, that extends transversely across the apparatus and is carried in suitable bearings in the frame, not shown. On this cam shaft there are mounted a pair of cams 86 and 86a, as shown in FIGS. 2, 3, 6, and 12.

The cam shaft 85 is arranged to be driven by a conventional motor and shaft speed reduction unit, generally designated 90, through means schematically indicated at 110 in FIG. 6 and to be described in more detail below in connection with FIGS. 2, 3, and 12, such that the shaft 85 carrying the cams 86 and 86a is rotated once for each time that the carrier chains 4 and 4a of the main conveyor 3 are moved through one distance equal to the length of one carrier mat 7.

In more detail, referring to FIGS. 2, 3, and 12, the motor and shaft speed reduction unit 90 comprises a conventional electric motor 91. The motor 91 may include a preliminary shaft speed reduction unit of any conventional design if so desired, and has an output shaft driving a sprocket 92.

The sprocket 92 drives a chain 93 that in turn drives a sprocket 94 on a transverse shaft 95 that is journalled in the frame of the apparatus in a conventional manner, not shown. Fixed to the shaft 95 is a drive sprocket 96 which drives a sprocket 97 connected to drive the shaft 25 through an intermediate chain 98. A smaller sprocket 99 connected to the shaft 95 drives a sprocket 100 connected to the cam shaft 85 through a chain 101.

The reduction system generally designated 110 in FIG. 6 comprises the reduced sprocket 99 on the shaft 95 and the enlarged sprocket 100 on the drive cam shaft 85.

A sprocket 102 fixed to the shaft 95 drives a chain 103 as best seen in FIG. 12. The chain 103 is connected to a sprocket 104 that is fixed to a shaft 105, journalled in the frame of the apparatus in bearings suggested at 106 and 106a.

The shaft 105 drives the input sides 107 and 107a of each of a pair of one-way, or over-running, clutches generally designated 108 and 108a. The output sides 109 and 109a, of the clutches 108 and 108a, respectively, are connected to shafts 111 and 111a, respectively, in FIG. 12.

The one-way clutches 108 and 108a are the conventional variety arranged to slip when the shaft 105 is driven in the direction of the arrow shown in FIG. 12 at a faster rate than the shafts 111 and 111a are moving in the same direction, but which will lock up and prevent the movement of the shafts 111 and 111a at a slower speed (in the direction of the arrow in FIG. 12) than the speed of the shaft 105.

Comparing FIGS. 6 and 12, the output side 109 of the typical one of the clutches 108 and 108a shown in FIG. 12 is connected to a yoke 115 formed with a fork 116 that receives a pair 117. The pin 117 is fixed to an arm 118 that is connected to the frame element 79 in FIG. 12 so that the yoke 115 is constrained to follow the position of the ramp 72.

A cam follower 123 is fixed to an arm 124 that is connected to the frame member such as 79 as shown in FIGS. 6 and 12. Corresponding elements on the other side of the apparatus are designated by reference characters followed by the suffix a in FIG. 12, and only the lower side of the apparatus shown in FIGS. 3 and 12 will be described, with reference also to FIG. 6.

As indicated in FIG. 6, the cam 86 has a dwell portion 120 followed by a rising portion that terminates in the region of maximum radius 121 and then abruptly drops off as suggested in 122. As the shaft 85 is rotated in the direction of the arrow, as shown in FIG. 6, the cam follower 123 gradually raises the ramp 72, while the yoke 115 is accompanying it, causing the shaft 111 to gradually rotate counterclockwise as seen in FIG. 6. This action causes it to rotate less rapidly than the shaft 105 in FIGS. 3 and 12, in the sense indicated by the arrow associated with the shaft 105 in FIG. 12, which allows the clutch 108 to slip.

However, when the follower 123 passes the region 121 on the cam 86 and encounters the falling section 122 of the cam, the weight of the carrier 7 on the ramp 72, in conjunction with the weight of the ramp 72 itself, causes the ramp 72 to attempt to move the shaft 111 counterclockwise in FIG. 6, which would cause the shaft 111 to attempt to move faster than the shaft 105 in the direction shown by the arrow. This action is prevented by the clutches 108 and 108a in FIGS. 3 and 12, so that the ramp 72 now moves counterclockwise about the axis of the shaft 184, as seen in FIG. 6, at the speed at which the shaft 105 is driven, as it cannot exceed this speed.

The reason for this arrangement is that to simply allow the follower 123 to fall off of the cam 86 and drop down would cause an abrupt shock to the carrier 7 on the ramp 72, which might damage the product. With the arrangement shown, the ramp 72 is moved quite rapidly, but at constant speed and smoothly without undue acceleration, back to the position shown in solid lines in FIG. 6 in which it is adapted to receive the next carrier 7 at the level presented by the main chains 4 and 4a.

Referring to FIGS. 2, 3, and 6, as each mat 7 is moved on the chains 4 and 4a over the ramp 72, the ramp 72 rises as the carrier 7 is moved forward while the supports such as 13 of the up elevator section 14a, together with the corresponding supports 13a of the elevator section 14b, are moved upwardly (as seen in FIG. 6) so that the leading edge of the carrier 7 is moved over to be supported by a rising support element such as 13. The subsequent rods 41 of the carrier 7, as seen, for example, in FIG. 5, are received on the carriers 13 and 13a, as the ramp 72 continues to move upwardly in FIG. 6.

Comparing FIGS. 6 and 7, as a carrier 7 is loaded onto a rising support member 13 of the up elevator 14, it is desired to unlatch it from the main chains 4 and 4a and to release it for upward transport by the up elevator. For this purpose, as each carrier 7 rises upwardly as it is driven to the left in FIGS. 6 and 7 while the ramp 72 is rising under the control of the cam 86, one of the hooks 43 on the leading rod 40 of the carrier 7 engages the arm 45 of a switch 46. This action causes electrical energy to be supplied, in a manner to be described below, to the input terminals 130 and 131 of a conventional electromagnetic clutch-brake 132.

Referring to FIG. 12, the clutch-brake 132 has an input shaft 133 that is adapted to be driven by a sprocket 134. The sprocket 134 is driven by a chain 135 connected to a sprocket 136 on the shaft 25, as best shown in FIG. 12. The ratio of the diameters of the sprockets 136 and 134 is such that the shaft 133 is driven at a higher speed than the shaft 25 that drives the main chains 4 and 4a; for example, at twice the speed of the shaft 25.

The clutch-brake 132 has an output shaft 137 that drives a sprocket 138, as seen in FIGS. 7 and 12. The sprocket 138 drives a chain 140 that is connected to a sprocket 141 fixed on a shaft 142. The shaft 142 is journalled in the frame of the apparatus in any suitable conventional manner, not shown.

Connected to the shaft 142 are a pair of sprockets 143 and 143a. Comparing FIGS. 7 and 12, the sprockets 143 and 143a drive a pair of unlatch chains 144 and 144a, respectively. The chains 144 and 144a each engage and drive two pairs of sprockets 145 and 146, and 145a and 146a, respectively.

The sprockets 145 and 145a are fixed to a common transverse shaft 147. The shaft 147 is journalled in any conventional manner in suitable bearings in the frame of the apparatus, not shown, for rotation in the direction of the arrow in FIG. 7. Similarly, the sprockets 146 and 146a are fixed to a common shaft 148.

Comparing FIGS. 2, 3, 7, and 12, the sprockets 27 and 27a are fixed on a common shaft 149, journalled in suitable bearings mounted on the frame as suggested at 150 and 150a in FIG. 12. The shaft 149 is located to position the sprockets 27 and 27a to carry the main chains 4 and 4a in a path that gradually rises through the infeed section. The shafts 147 and 148 are located so that the chains 144 and 144a move in a generally parallel path from a point between the sprocket 10 (FIGS. 1 and 2) and a point beyond the sprocket 27 (FIGS. 2 and 7), substantially at the level of the chains 4 and 4a.

A set of three outwardly projecting and equally spaced drive pins 152 are fixed, as by welding or the like, to the chain 144. A corresponding set of drive pins 152a are fixed to the chain 144a. These drive pins 152 and 152a are each adapted to engage a pair of the drive bars 47 and 48 on the leading rod 40 of a carrier mat 7 (FIG. 4).

When the clutch-brake 132 is energized, which occurs when a hook 43 on an arriving mat 7 engages the arm 45 of the microswitch 46 (FIGS. 7 and 15), the chains such as 144 are moved in the direction of the arrow in FIG. 7 at, for example, twice the speed of the main chains such as 4. One of the pins such as 152, and a corresponding one of the pins 152a, will then engage the bars 47 and 48 on the leading rod 40 of the mat 7, carrying the hooks 44 out of engagement with the rod 6 (FIGS. 6 and 7) as the mat 7 is loaded onto the arriving support 13 in the up elevator 14.

Comparing FIGS. 6 and 7, the mat 7 so engaged will be carried rapidly to the left as it is raised upwardly, until it is correctly positioned on the support 13, whereupon one of the arms 43 will engage the actuating arm 155 of a microswitch 156. As to be described below in more detail in connection with FIG. 15, the microswitch 156 will be opened at that time to de-energize the clutch-brake 132, and the unlatch mechanism will be stopped until the arrival of the next mat 7.

The drive system for the up elevator 14 is synchronized with the drive systems for the main conveyor 3, the down elevator 17, and the transfer section 16 in a manner next to be described. Essentially, the speed of the main conveyor is made equal to the speed of the elevators times the ratio of the length of the mats 7 to the vertical distance between adjacent elevator supports such as 13, or the equal distance between elevator supports such as 18, so that mats will leave the down elevator at the same rate at which they are supplied to the up elevator.

Comparing FIGS. 2 and 3, it will be recalled that the drive shaft 25 for the main conveyor 3 is driven by the motor 91 through the sprocket 92, the chain 93, the sprocket 94, the shaft 95, the sprocket 96, the chain 98, and the sprocket 97 on the shaft 25. In turn, the shaft 25 drives the shaft 26 through the main chains 4 and 4a and the sprockets 19 and 19a.

Synchronous shaft speeds for the elevators may be taken from the output shaft of the motor 91 in various ways, but as here shown the shaft 26 serves as the synchronizing shaft that controls the speeds of the elevators and of the intermittently energised transfer section drive shafts, to be described. Referring to FIG. 3, the ends of the shaft 26 are fixed to bevel gears 162 and 162a.

The gears 162 and 162a mesh with bevel gears 163 and 163a, respectively. The gears 163 and 163a are fixed on lower down elevator drive shafts 164 and 164a, respectively. The ratio of the gears such as 162 and 163 is chosen to effect equal transfer ratios, as described above.

Comparing FIGS. 3 and 5, the shaft 164 drives the lower sprockets 64 and 65 of the down elevator section 17a, and the shaft 164a drives the corresponding lower sprockets of the down elevator section 17b. As indicated by the arrows in FIG. 3, the gearing so arranged drives the shafts in the appropriate directions to continuously move the support bars 18 and 18a of the down elevator downwardly on the inner, carrier mat supporting, sides of the down elevator sections 17a and 17b.

As suggested in FIGS. 5 and 11, synchronous drives for the up elevator sections 14a and 14b may be derived from the upper shafts 60 and 60a of the down elevator 17. In particular, the upper shaft 60 of the down elevator section 17a drives the adjacent upper shaft 165 of the up elevator section 14a, in the opposite sense, through a gear 166, fixed on the shaft 60, and a gear 168 fixed on the shaft 165. Corresponding gearing between the other elevator sections 17b and 14b, not shown, drives the up elevator section 14b. As indicated in FIGS. 5 and 11, the top shafts 165 and 165a of the up elevator are above the top shafts 60 and 60a of the down elevators.

Comparing FIGS. 3, 10, and 11, a sprocket 169 fixed on the shaft 26 (FIGS. 3 and 11) drives a sprocket 170 through a chain 171. The sprocket 170 is fixed on a shaft 172 (FIG. 11), journalled in suitable bearings in the frame, not shown.

The shaft 172 drives the input side of a conventional electromagnetic clutch-brake 161. As schematically indicated in FIGS. 10, 11, and 14, the clutch-brake 161 has a winding 175 with terminals 173 and 174.

The clutch-brake 161 may be of the conventional variety which connects the input shaft 172 to an output shaft 176, to drive the shaft 176 at the speed of the shaft 172, when the winding 175 is energized by the application of a source of voltage to the terminals 173 and 174. When the winding 75 is de-energized, a spring-loaded brake, not shown in detail, stops the output shaft 176 against the frame to stop the shaft 176 at a predetermined shaft angle, for purposes to appear.

The shaft 176 (FIG. 11) may be journalled in suitable bearings in the frame, as suggested at 177, and is fixed to a sprocket 178. As suggested in FIGS. 10 and 11, the sprocket 178 drives a sprocket 179 fixed on a transfer section drive shaft 180 through a chain 181.

As shown in FIGS. 10 and 11, the shaft 180 is journalled in suitable bearings 182 and 182a. The bearings 182 and 182a are fixed on a suitable overhead portion of the frame generally designated 183 (FIG. 11), to be described.

Comparing FIGS. 10 and 11, a pair of sprockets 184 and 184a are fixed on the shaft 180. The sprockets 184 and 184a drive sprockets 185 and 185a, respectively, through transfer drive chains 186 and 186a, respectively.

The sprockets 185 and 185a are fixed on a shaft 187. The shaft 187 is journalled in suitable bearings 188 and 188a that are secured to the overhead frame 183.

The chains 186 and 186a are supported over their upper and lower courses by chain guides and supports 189, 189a, and 190, 190a, respectively, comprising angle irons fixed to suitable elements of the frame, not shown. On the upper surfaces of the chain guides, such as 189 and 190, are preferably fixed antifriction pads, such as 191 and 192, respectively (FIG. 10), of plastic or the like.

Referring to FIG. 11, the overhead frame 183 that carries the bearings 182, 182a, 188, and 188a, and thereby supports the transfer mechanism, comprises end cross members 195 and 196 joined by side rail members 197 and 197a. These members may all be of angle irons welded together, and to other elements of the main frame, not shown, to form a stout rectangular support frame.

Referring to FIGS. 10 and 11, a transfer carriage generally designated 202 is provided which comprises a frame composed of side rails 203 and 203a joined by cross pieces 198 and 204, of angle iron welded to the side rails, for example. On the side rails such as 203 are fixed guide bars such as 205.

The guide bars such as 205 are adapted to slide on suitable antifriction pads such as 206 and 209, respectively. The transfer carriage 202 is thus adapted to move to the right and left as seen in FIG. 11, between the position shown in FIG. 11, in which it is adapted to receive a mat 7 from the up elevator 14, and a corresponding position to the left in FIG. 11, in which it is adapted to deliver a mat 7 to the down elevator 17 in a manner to be described.

Comparing FIGS. 10 and 11, cranks such as 210 have arms such as 211 welded to the chains such as 186. Pins such as 212 formed integral with the other ends of the cranks such as 210 are journalled in the side rails such as 203. By this arrangement, as the sprockets such as 184 are driven in the shaft 180, causing the chains such as 186 to move counterclockwise as seen in FIG. 10, the transfer carriage 202 is carried to the left in FIG. 10 guided by the rails such as 208 and 209, until the crank pins such as 210 pass around the sprockets such as 184, whereupon the transfer carriage is moved back to the position shown in FIG. 10.

Comparing FIGS. 10 and 11, it will be recalled that the upper drive shafts such as 165 for the up elevator 14 are above the upper drive shafts 60 and 66 for the down elevator 17. As best seen in FIG. 10, the sprockets such as 184 are made correspondingly smaller than the sprockets 185, and the guide rails 208 and 209 are sloped generally downwardly toward the left in FIGS. 10 and 11, so that the transfer carraige 202 is moved generally downwardly as it papsses from the position shown in FIGS. 10 and 11 to the point at which it begins its return movement as the arms 211 move over the sprockets 184.

Formed integral with the cross piece 204 of the transfer carriage 202, and depending from the ends thereof, are a pair of hooks 215 and 215a. These hooks are adapted to engage the outer hooks 50 on the leading rod 40 of each mat 7 arriving at the transfer section on the up elevator. The hooks 215 and 215a stopped at the end of each transfer cycle in a position behind the arriving position of the hooks 50, as will appear.

As shown in FIG. 10, one of the cross rods 41 on each mat 7 entering the transfer section on a pair of the supports such as 13 and 13a of the up elevator engages the arm 157 of a microswitch 158. This action closes a circuit path between leads 159 and 160, causing the energization of the clutch-brake 161 (FIGS. 10 and 11), by circuit means to be described in connection with FIG. 13.

Comparing FIGS. 10 and 11, when the clutch-brake 161 is energized, the shaft 176 is coupled to the constantly rotating shaft 172, so that the shaft 180 is driven through the sprocket 178, chain 181, and sprocket 179. Referring now to FIG. 10, the chains such as 186 will now be driven counterclockwise, drawing the transfer carriage 202 to the left in FIG. 10, and bringing the hooks 215 and 215a into engagement with the hooks 50 on the leading rod 40 of the arriving mat 7.

Comparing FIGS. 10, 11, 13, and 14, as each mat 7 is moved off of a rising pair of supports 13 and 13a of the up elevator by the transfer carriage 202, the ends of its rods 40 and 41 are supported on pivotally mounted transfer rails 220 and 220a, of angle iron or the like. As best shown in FIGS. 11 and 13, the transfer rails such as 220 are formed integral with depending ears such as 21 to each of which is affixed a transverse axle 222.

The axles such as 222 are journalled in upstanding ears such as 223 and 224. The ears 223 and 224 may be welded or otherwise secured to suitable members such as 225 of the fixed frame. By this arrangement, the transfer rails such as 220 are adapted to rotate about the axes of the axles such as 222, for purposes to be described.

Referring to FIGS. 13, a weight such as 226 is suspended from the up elevator end of each transfer rail such as 220 by means indicated in FIG. 13 as a flexible wire cable 227. The weight 226 tends to rotate the rail 220 clockwise in FIG. 13.

An arm 227 is bent at one end to form a bracket 228. The bracket 228 is welded to the rail 220. The arm 227 is bent at its other end to form a hook 229 that is adapted to engage the underside of the end of each of the supports such as 18 of the down elevator 17 in turn.

In the position of the parts shown in FIG. 13, the hook 229 is fully engaged with one of the supports 18. As the support 18 moves downwardly, the rail 220 will follow it, until in the course of its rotation about the axis of the axle 222, the hook disengages the support 18, whereupon the rail 20 will rotate rapidly clockwise in FIG. 13 until the hook 229 engages the next descending support 18. To avoid shock during this rotation, a shock absorber is provided which comprises an air cylinder 230 fixed to the frame of the apparatus. A piston rod 231 extends upwardly out of the air cylinder 230 to a stop 232. The stop 232 is engaged by the rail 220 during the course of its clockwise rotation.

As the rail 220 reaches the position shown in FIG. 13, when it has just been stopped by the hook 229 in engagement with a support 18, the arm 233 of a microswitch 234 mounted on the rail 220 engages a portion of the frame, such as the member 225, and is opened to end the transfer cycle in a manner to be described in more detail below in connection with FIG. 15. This action is timed to occur when the transfer carriage 202 is returned to the position shown in FIGS. 10 and 11.

As indicated in FIGS. 13 and 14, guides such as 235 and 236 are fixed to the ends of the transfer rail 220 by brackets such as 237 and 238, respectively. The guides 235 and 236 may be made of any convenient anti-friction material, such as plastic or the like, and serve to ease the transition of the mats 7 from the supports 13 onto the rail 220, and from the rail 220 onto the supports 14.

By the arrangement just described, as each mat 7 reaches the position shown in FIGS. 10 and 13, the microswitch 158 in FIG. 10 is closed to energize the clutch-brake 161. The hooks such as 215 on the transfer carriage 202 then engage the hooks such as 50 on the mat 7, drawing the mat 7 off of the supports such as 13 of the up elevator and onto the transfer rails such as 220, and then onto a pair of the supports such as 18, while the ends of the rails 220 and 220a are kept in alignment with the supports such as 13 and 18 by the hooks such as 229. The supports such as 13 stay in alignment with the rails such as 220 during this transfer interval because the up elevator is driven synchronously with the down elevator, as described above.

After each mat 7 has been transferred from the up elevator to the down elevator in the manner described, the transfer carriage 202 moves back to the position shown in FIG. 1. At the appropriate time during this movement, the hooks such as 29 disengage the supports such as 18, and the rail 220 rotates back to the initial position, opening the microswitch 234 when the carriage 202 is back in the position shown in FIG. 10.

Mats 7 deposited on the down elevator 17 in the manner just described are transferred to the main conveyor at the pickup station 31 in a manner next to be described with reference to FIGS. 2, 3, 4, 8, and 9. Referring first to FIG. 2, in the region of the pickup station, the main chains such as 4 pass around the sprockets such as 29 and 30, then generally upwardly over chain guides such as 32, and thence over the sprockets such as 19.

Figure 9:
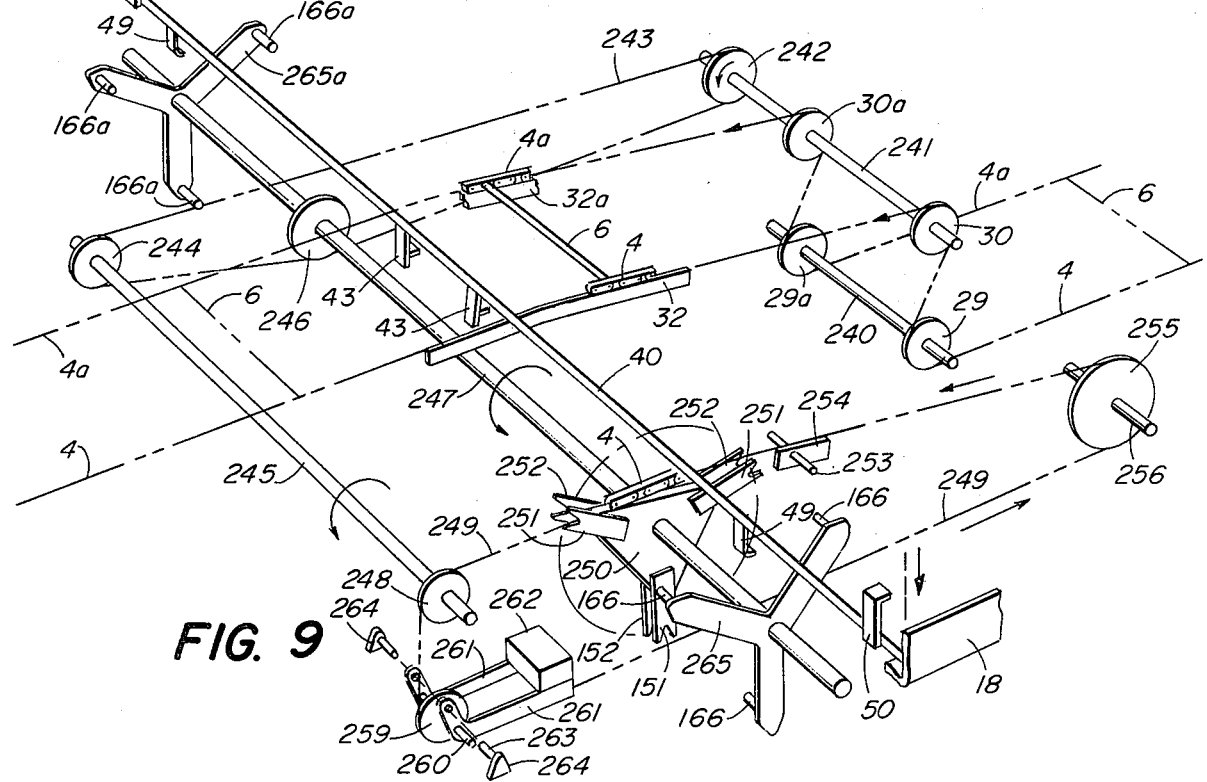
FIG. 9 is a schematic perspective sketch, with parts omitted and parts broken away, showing the pickup station in FIG. 1 in more detail.

Comparing FIGS. 3 and 9, the sprockets 29 and 29a are fixed on a shaft 240 that is journalled in the frame of the apparatus in any conventional manner, not shown. The sprockets 30 and 30a are fixed on a shaft 241, also journalled in the frame, and upon which there is fixed a sprocket 242.

The sprocket 242 drives a chain 243. Comparing FIGS. 3 and 9, the chains 243 drives a sprocket 244 fixed on a shaft 245, and also engages an idler sprocket 246, not shown in FIG. 3 but shown in FIG. 9. The idler sprocket 246 serves to guide the chain 243 around a shaft 247. The sprocket 246 is journalled for rotation on the shaft 247. The shafts 245 and 247 are journalled in the frame of the apparatus in any conventional manner, not shown.

A sprocket 248 is fixed on the shaft 245, and drives a pickup chain 249. The chain 249 passes over an equilateral triangular bracket 250 that is fixed on the shaft 247 as shown in FIG. 9. At the apices of the bracket 250 are fixed outstanding pairs of yokes 251 and 252.

The yokes 251 and 252 are formed with jaws adapted to receive a pin 253. The pin 253 is fixed on a bracket 254 that is welded to the chain 249.

The chain 249 passes around a sprocket 255 that is fixed on a shaft 256. The shaft 256 is journalled in bearings 257 and 258 that are fixed to the frame, as suggested in FIG. 3.

Finally, the chain 249 passes around a movable sprocket 259. As shown in FIG. 9, the sprocket 259 is fixed on a shaft 260. The shaft 260 is journalled in a pair of bellcranks 261. One end of each of the bellcranks 261 is journalled on a shaft 263. The shaft 263 is secured in suitable brackets 264, that are fixed to the frame as indicated in FIG. 9. A counterweight 262 is connected to the other ends of the bellcranks 261, so that the chains 249 can be raised or lowered under the influence of the triangular bracket 250 by swinging the sprocket 259 around the axis of the shaft 263 against the torque produced by the counterweight 262.

It will be apparent that by the arrangement just described, at each revolution of the chain 249 in the sense indicated by the arrows in FIG. 9, the pin 253 will engage the jaws in a pair of the yokes 251 and 252 on the bracket 250, and thereby rotate the shaft 247 120° before disengaging the yokes 251 and 252. The shaft 247 may lightly braked against the frame in any conventional manner, not shown, so that it will stop upon disengagement with the next pair of yokes 251 and 252 in position for engagement by the pin 253 on the next revolution of the chain 249.

Figure 8:
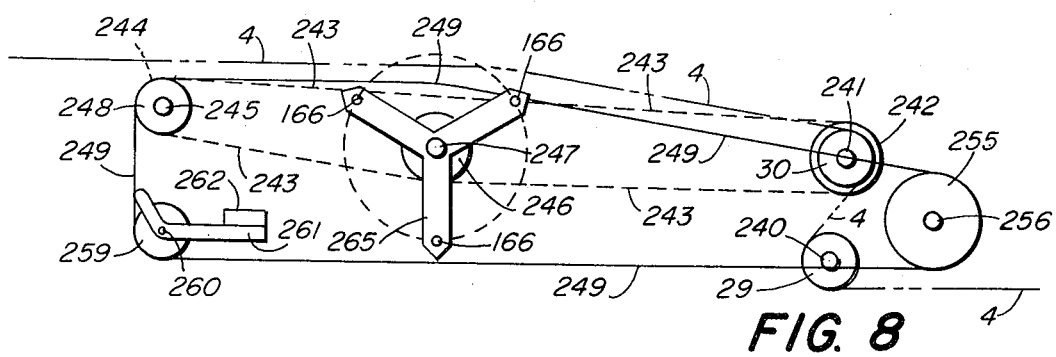
FIG. 8 is a fragmentary schematic elevational sketch of a portion of the pickup station forming a part of the apparatus of FIG. 1.

A pair of three-armed spiders 265 and 265a are fixed on the shaft 247 as indicated in FIGS. 2, 8, and 9. The arms of the spiders are mutually spaced by 120°, and each carries a pin such as 166. The pins 166 and 166a are each adapted to engage the hooks 49 on the leading rods 40 of the mats 7.

As each mat 7 arrives on a pair of descending supports 18 and 18a of the down elevator, the synchronously driven chain 249 brings the pin 253 into engagement with a pair of the yokes 251 and 252, driving the shaft 247 counterclockwise as seen in FIG. 9. The hooks 49 on the leading rod 40 of the mat 7 will then be engaged by a pair of pins 166 and 166a on the spiders 265 and 265a, carrying the forward portion of the mat 7 off of the down elevator and then bringing it down into position for the next arriving cross rod 6 on the main chains 4 and 4a to engage the hooks 43. The main chains 4 and 4a will then convey the mat to the delivery station in FIG. 1, where the product 8 is transferred to the conveyor 21 and the mat 7 begins its return trip to the loading station.

Figure 15:
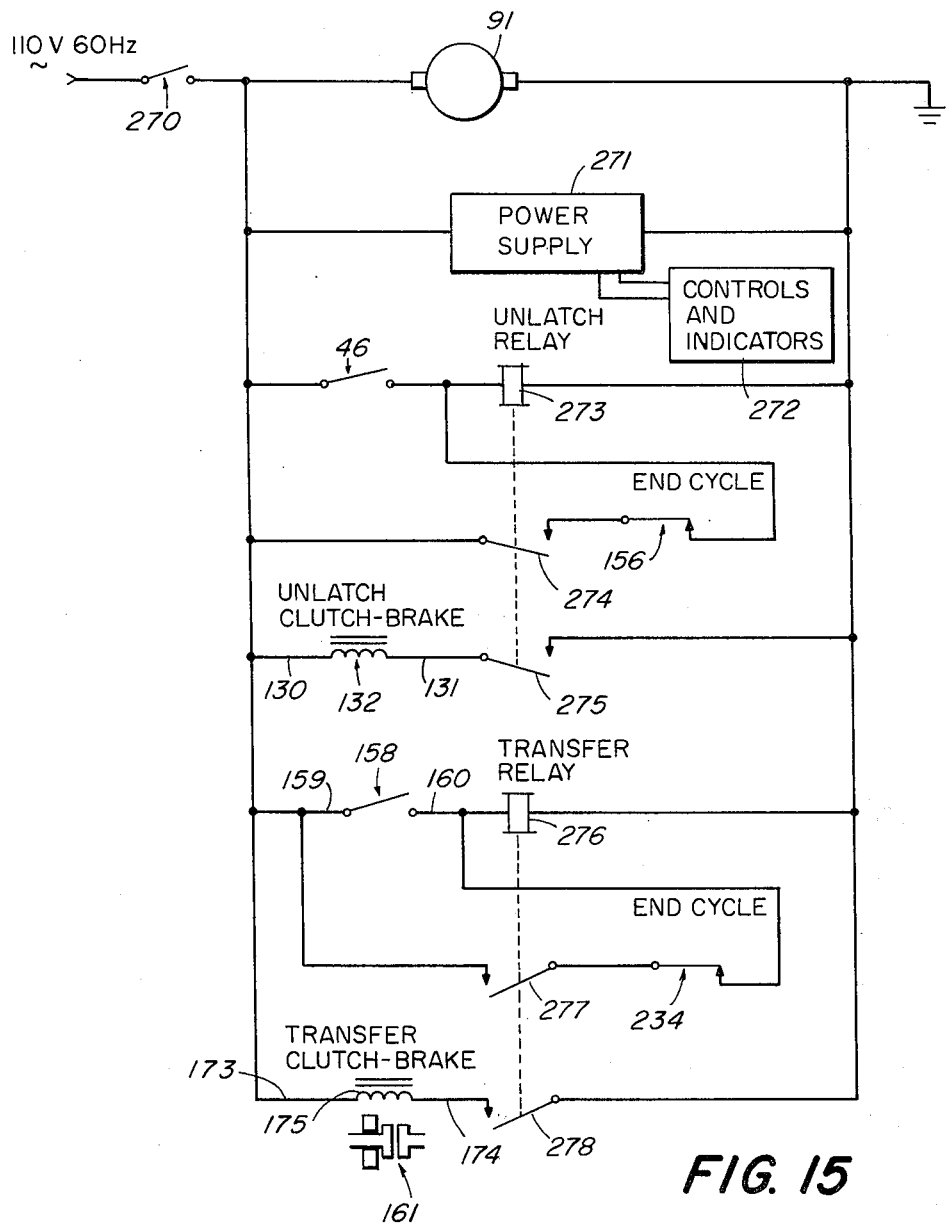
FIG. 15 is a schematic block and wiring diagram of a control system for the apparatus of FIGS. 1 through 12.

FIG. 15 illustrates the essential elements of a control system for the apparatus of FIGS. 1–14. The apparatus is mechanically synchronized, for the most part, but the requirements for mechanical synchronism are advantageously relaxed by synchronizing the unlatch and transfer functions electromechanically in response to the arrival and departure of each of the mats.

As indicated in FIG. 15, power for the drive and control system may be supplied by conventional 60 Hz, 110 volt line. An on-off switch 270 controls the application of power to the system.

When the switch 270 is closed, current is supplied to the drive motor 91, to begin operation of the mechanically synchronized portion of the apparatus in the manner described above. At the same time, a conventional DC power supply 271 may be energized. Such a power supply may be desired for such process controls and indicators 272 as may be required to control the process to be carried out, monitor the operation of the system, and operate such indicators as may be required.

Referring to FIG. 1, when operation of the apparatus is begun, unloaded mats 7 will progress through the apparatus until it is desired to begin processing, by establishing the desired processing environment and then supplying product units 8 to the mats as they arrive at the loading station.

Comparing FIGS. 6 and 7, as each mat 7 passes around the sprockets such as 10, it will be raised on the elevator rammp 72, while the left end of the ramp 71 is kept in registry with an ascending pair of the up elevator supports 13 and 13a, all under the influence of the cams such as 86. During this process, the arm 45 of the microswitch 46 in FIG. 7 will be engaged, briefly closing the microswitch 46.

Referring to FIG. 15, when the microswitch 46 is closed, a pickup circuit for a conventional relay 273 will be completed, causing the relay 273 to be energized and engage a pair of front contacts 274 and 275. Closing the contacts 274 will complete a stick circuit for the relay 273 over the normally closed contacts of the microswitch 156, described above. Closing the contacts 275 will energize the unlatch clutch-brake 132.

Referring again to FIGS. 6, 7, and 12, with the clutch-brake 132 energized, the unlatch chains such as 144 will be driven more rapidly than the main chains such as 4. A pair of the pins 152 and 152a on the unlatch chains will then engage the bars 47 and 48 on the leading rod 40 of the approaching mat 7, and carry the hooks 43 on the mat 7 out of engagement with the then engaged cross rod 6, while carrying the mat 7 up the elevator ramp 72. The ramp 72 will have its left end, as seen in FIG. 6, kept in registry with a pair of supports such as 13 on the up elevator during this interval by the cams such as 86 on the constantly rotating shaft 85.

When the arriving mat 7 leaves the elevator ramp 72 during this process, the cam followers such as 123 in FIG. 6 will reach the rapidly falling portions such as 122 on the cams such as 86. The elevator ramp 72 will then fall back rapidly to the position shown in full lines in FIG. 6, to begin the transfer of the next mat 7 to the next pair of supports 13, 13a on the up elevator. As described above, the falling movement of the elevator ramp 72 will be at the constant speed of the shaft 111 because of the action of the one-way clutches 108, 108a (FIG. 12).

Referring to FIGS. 7 and 15, as the mat 7 loaded on the up elevator in the manner just described reaches the fully loaded position on the supports 13, 13a, the microswitch 156 will be opened while the pins 152, 152a pass over the sprockets 146, 146a, and then disengage the bars 47 and 48 on the leading rod 40 of the mat 7 (FIG. 4). As shown in FIG. 15, opening the microswitch 156 will break the stick circuit for the unlatch relay 273. The clutch-brake 132 will then be de-energized, and the shaft 137 (FIG. 12) will be braked to stop the unlatch mechanism in position to deliver the next mat 7 to the up elevator.

Referring to FIGS. 10 and 15, as a loaded mat 7 on the up elevator arrives in position to be carried over to the down elevator by the transfer mechanism, the microswitch 158 will be momentarily closed as described above. As shown in FIG. 15, closing the switch 158 will complete a pickup circuit for a transfer relay 276.

The transfer relay 276 has two front contacts 277 and 278, closed when the relay is energized. Closing the front contact 278 of the relay 276 energizes the clutch-brake 161, causing the transfer carriage 202 (FIG. 10) to begin driving to the left as seen in FIG. 10.

The hooks 215, 215a on the transfer carriage 202 will now engage the hooks 50 on the leading rod 40 of the mat 7. As seen in FIG. 10, the mat 7 will now begin its transfer movement, opening the microswitch 158.

Referring to FIGS. 13 and 15, when the transfer relay 176 is energized, it prepares a stick circuit over its front contact 277 which remains open until the end cycle microswitch 234 is closed. The microswitch 234 is closed shortly after the transfer cycle is begun by the action of the down elevator support 18 in engagement with the hook 229, which carries the rail 220 counterclockwise in FIG. 13 and thus brings the arm 233 of the microswitch 234 out of engagement with the frame element 225, thus closing the switch 234 and completing the stick circuit for the relay 276 that was prepared over the front contact 277 of the relay 276 as described above. Comparing FIGS. 10 and 15, the selected element of the mat 7, such as the rod 41 referred to above, or other means, such as one of the supports 13 of the up elevator, keeps the switch 158 closed long enough to ensure that the switch 234 is closed in the manner just described, so that the clutch-brake 161 will remain energized until the switch 234 is next opened.

Comparing FIGS. 13 and 15, when the transfer of a mat 7 to the down elevator 17 has been completed, and while the transfer carriage 202 (FIG. 10) is being returned to its initial position, the rails 220, 220a will swing back to the position shown in FIG. 13 under the influence of the weights such as 226 and under the restraint of the shock absorber 230. At the time when the parts of the transfer section are returned to their initial positions, the microswitch 234 will again be opened, and the relay 276 (FIG. 15) will be de-energized, releasing its contacts 277 and 278. The clutch-brake 161 will then be de-energized, stopping the transfer carriage on its waiting position.

Transfer of the mats 7 from the down elevator to the pickup station, from the pickup station to the main chains, and thence through the unloading station back to the loading station, will proceed automatically and synchronously as described above. The apparatus will continue to carry product from the loading station through the processing zone to the unloading station, while continuously recycling the product carrying mats 7, in the manner described, until the on-off switch 270 in FIG. 15 is again opened.

While the invention has been described with reference to the details of a particular embodiment thereof, many changes and variations will occur to those skilled in the art upon reading this description. Such can obviously be made without departing from the scope of the invention.

Having thus described the invention, what we claim is:

1. A conveying system for continuously conveying articles through a processing environment from a loading station to a delivery station, comprising first conveyor means movable over a closed path between said loading station and said delivery station, a series of flexible carrier mats for supporting groups of articles to be processed, each of said carrier mats being engageable with said first conveyor means and adapted to be carried thereby over at least a segment of said path beginning at a first point ahead of said delivery station, continuing past said delivery station back to said loading station and terminating at a second point beyond said loading station; first elevator means located adjacent said second point and adapted to convey a series of said mats in a first direction away from said first conveyor means; first carrier exchange means located adjacent said second point and responsive to the arrival of one of the said mats at a third point between said loading station and said second point on said path for engaging the mat and transferring the mat to said first elevator means, second elevator means located between said second point and said first point on said path and adapted to carry a series of said carrier mats in a second direction opposite said first direction toward said path, second carrier exchange means located adjacent said first elevator means at a predetermined distance in said first direction from said first conveyor means and responsive to the arrival of the carrier mat on said first elevator means for transferring the mat to said second elevator means to be carried back to said first conveyor means, and third carrier exchange means located adjacent said second elevator means and said first conveyor means and responsive to the arrival of a mat on said second elevator means for transferring the mat to and into engagement with said first conveyor means to be carried to said delivery station and thence back through said loading station to said third point.

2. A conveying system for continuously conveying articles through a processing environment from a loading station to a delivery station substantially at the level of said loading station, comprising a main conveyor including a pair of endless flexible carrier elements and means for moving said carrier elements continuously over closed parallel paths between said loading station and said delivery station, a series of cross pieces connected between and fixed to said carrier elements at spaced intervals along said paths, a series of flexible carrier mats adapted to be supported on said carrier elements, means connected to each of said mats for detachably connecting the mat to any one of said cross pieces, a first vertical elevator and a second vertical elevator located in that order between said loading station and said delivery station, said first vertical elevator comprising means for supporting a series of said mats and carrying said mats in a vertically spaced sequence from a first position adjacent said carrier elements to a second position vertically displaced in a first sense from said carrier elements, said second elevator comprising means for supporting a series of said mats and carrying said mats in a vertically spaced sequence from a third position vertically displaced in said first sense from said carrier elements to a fourth position adjacent said carrier elements, means for driving said elevator means in synchronism with said carrier elements, first carrier exchange means located adjacent said first position and responsive to the arrival of a carrier mat supported on said carrier elements and engaged with one of said cross pieces for detaching the mat from the cross piece and transferring it to said first elevator to be carried thereby to said second position, second carrier exchange means located between said second and said third positions and responsive to the arrival of a mat at said second position for transferring that mat from said first elevator to said second elevator to be carried thereby to said fourth position, and third carrier exchange means located adjacent said fourth position and effective when one of said mats arrives at said fourth position for transferring that mat into a position in which it will be engaged by the next arriving one of said cross pieces.

3. A conveying system for continuously transporting articles from a loading station through a processing environment to an unloading station, comprising a conveyor; an up elevator; a down elevator; first carrier exchange means; second carrier exchange means; third carrier exchange means; a series of flexible carrier mats each comprising means adapted to support a group of articles to be processed; and means for driving said conveyor, said up elevator, and said down elevator in synchronism; in which said conveyor comprises means for transporting said mats in sequence from a first point in advance to said unloading station to a second point following said loading station; said up elevator comprises means for moving said mats upwardly, said down elevator comprises means for moving said mats downwardly; said first carrier exchange means comprises means responsive to the arrival of each of said mats supporting on said conveyor at said second point for transferring that mat to a first of said up and down elevators; said second carrier exchange means comprises means responsive to the arrival of each of said mats on said first elevator at a predetermined distance from said conveyor for transferring that mat to the second of said elevators; and said third carrier exchange means comprises means effective when a mat approaches said conveyor on said second elevator for transferring that mat to said conveyor.

4. A conveying system for continuously carrying a stream of articles supplied at a loading station through a processing environment to a delivery station substantially at the level of said loading station, said system comprising a conveyor, means for continuously moving said conveyor over a closed path between said loading station and said delivery station, a plurality of flexible carrier mats each comprising means for supporting a group of articles to be processed, first and second elevators disposed in spaced relation along said path and extending upwardly therefrom, a transfer carriage, means for moving said transfer carriage over a closed path between said elevators and above said conveyor, said first elevator comprising means for carrying a vertically spaced array of said mats from said conveyor to said transfer carriage, said second elevator comprising means for carrying a vertically spaced array of said mats from said transfer carriage to said conveyor, said mats being disposed on said conveyor and said elevators in a sequence extending on said conveyor over a path from said second elevator through said delivery station to said loading station, thence to said first elevator, thence in a vertically spaced stacked array on said first elevator to said transfer carriage, and thence in a vertically spaced stacked array on said second elevator back to said conveyor, means for driving said elevators and said conveyor in synchronism as speeds selected to deliver mats on said second elevator to said conveyor at the same rate that mats are brought to said first elevator on said conveyor, first carrier exchange means located adjacent said conveyor and said first elevator and responsive to the arrival of a carrier mat on said conveyor for transferring that mat to said first elevator, drive means operable to drive said transfer carriage over its said path, means responsive to the arrival of a mat on said first elevator adjacent said transfer carriage for operating said drive means, means on said transfer carriage for engaging each arriving mat when said drive means is energized and transferring that mat onto said second elevator, means for interrupting the operation of said transfer carriage drive means when said transfer carriage returns to a position in which said mat engaging means in prepared to engage the next arriving mat on said first elevator, and additional carrier exchange means adjacent said second elevator and said conveyor and effective when a mat arrives on said second elevator for transferring that mat to said conveyor.

5. A conveying system for continuously conveying articles through a processing environment from a loading station to a delivery station, said system comprising, first conveyor means comprising a pair of spaced endless carrier elements; means mounting said carrier elements for movement over closed parallel paths between said loading station and said delivery station; a series of carrier mats for supporting groups of articles to be processed, said carrier mats being flexible in a longitudinal dimension and inflexible in a transverse dimension, each of said carrier mats being engageable with said carrier elements with said transverse dimension normal to said path and adapted to be carried thereby in the direction of said longitudinal dimension over at least a segment of said path beginning at a first point ahead of said delivery station, continuing past said delivery station back to said loading station and terminating at a second point beyond said loading station; first elevator means located adjacent said second point for carrying a series of said mats in a first direction away from said first conveyor means, said first elevator means comprising spaced means parallel to said carrier elements for supporting said mats along edges of said mats parallel to said longitudinal dimension; first carrier exchange means located adjacent said second point and responsive to the arrival of one of the said mats at a third point between said loading station and said second point on said path for engaging the mat and transferring the mat to said first elevator means; second elevator means located between said second point and said first point on said path for carrying a series of said carrier mats in a second direction opposite said first direction toward said path, said second elevator means comprising spaced means parallel to said carrier elements for supporting said mats along said edges of said mats; second carrier exchange means located adjacent said first elevator means at a predetermined distance in said first direction from said first conveyor means and responsive to the arrival of a carrier mat on said first elevator means for transferring the mat to said second elevator means to be carried back to said first conveyor means; and third carrier exchange means located adjacent said second conveyor means and said first conveyor means and responsive to the arrival of a mat on said second conveyor means for transferring the mat to and into engagement with said first conveyor means to be carried to said delivery station and thence back through said loading station to said third point.

6. A conveying system for continuously conveying articles through a processing environment from a loading station to a delivery station substantially at the level of said loading station, comprising a main conveyor; means for moving said main conveyor continuously over a closed path between said loading station and said delivery station; a series of flexible carrier mats adapted to be supported on said main conveyor; means connected to each of said mats for detachably connecting the mat to said main conveyor; a first vertical elevator and a second vertical elevator located in that order between said loading station and said delivery station; said first vertical elevator comprising means for supporting a series of said mats and carrying said mats in a vertically spaced sequence from a first position adjacent said main conveyor to a second position vertically displaced in a first sense from said main conveyor; said second elevator comprising means for supporting a series of said mats and carrying said mats in a vertically spaced sequence from a third position vertically displaced in said first sense from said main conveyor to a fourth position adjacent said main conveyor; means for driving said elevator means in synchronism with said main conveyor, first carrier exchange means located adjacent said first position and responsive to the arrival of a carrier mat supported on and engaged with said main conveyor for disengaging the mat from said main conveyor and transferirng it to said first elevator to be carried thereby to said second position, second carrier exchange means located between said second and said third positions and responsive to the arrival of a mat at said second position for transferring that mat from said first elevator to said second elevator to be carried thereby to said fourth position; and third carrier exchange means located adjacent said fourth position and effective when one of said mats arrives at said fourth position for transferring that mat into a position in which it will be engaged by said main conveyor.

7. A conveying system for continuously transporting articles from a loading station through a processing environment to an unloading station, comprising a conveyor; a first elevator; a second elevator; first carrier exchange means; second carrier exchange means; third carrier exchange means; a series of carrier means for supporting a group of articles to be processed; and means for driving said conveyor, said first elevator, and said second elevator in synchronism; in which said conveyor comprises means for transporting said carrier means in sequence from a first point in advance of said unloading station to a second point following said loading station; said first elevator comprises means for moving said carrier means in a first direction away from said conveyor; said second elevator comprises means for moving said carrier means toward said conveyor; said first carrier exchange means comprises means responsive to the arrival of each of said carrier means supported on said conveyor at said second point for transferring that carrier means to said first elevator; said second carrier exchange means comprises means responsive to the arrival of each of said carrier means on said first elevator at a predetermined distance from said conveyor for transferring that carrier means to said second elevator; and said third carrier exchange means comprises means effective when a carrier means approaches said conveyor on said second elevator for transferring that carrier means to said conveyor.

8. A conveying system for continuously carrying a stream of articles supplied at a loading station through a processing environment to a delivery station, said system comprising a conveyor, means for moving said conveyor continuously over a closed path between said loading station and said delivery station, a plurality of longitudinally flexible and transversely inflexible carrier means for supporting a group of articles to be processed on longitudinally extending supports; first and second elevators disposed in spaced relation along said path and extending upwardly therefrom, a transfer carriage, means for moving said transfer carriage over a closed path between said elevators and above said conveyor, said first elevator comprising means for carrying a vertically spaced array of said mats from said conveyor to said transfer carriage, said second elevator comprising means for carrying a vertically spaced array of said mats from said transfer carriage toward said conveyor; said carrier means being disposed on said conveyor and said elevators in a sequence extending on said conveyor over a path from said second elevator through said delivery station to said loading station to said first elevator and thence in a vertically spaced stacked array on said first elevator for said first distance and thence in a vertically spaced stacked array on said second elevator back to said conveyor; means for driving said elevators and said conveyor in synchronism at speeds selected to deliver carrier means on said second elevator to said conveyor at the same rate that mats are brought to said first elevator on said conveyor; first carrier exchange means located adjacent said conveyor and said first elevator and responsive to the arrival of one of said carrier means on said conveyor for transferring that carrier means to said first elevator; second carrier exchange means responsive to the arrival of a carrier means on said first elevator at said first distance from said conveyor for transferring that carrier means to said second elevator, and third carrier exchange means adjacent said second elevator and said conveyor and effective when a carrier means arrives on said second elevator for transferring that carrier means to said conveyor.

* * * * *